(12) United States Patent
Van Der Lee et al.

(10) Patent No.: US 9,680,326 B2
(45) Date of Patent: Jun. 13, 2017

(54) POWER TRANSFER ARCHITECTURE EMPLOYING COUPLED RESONANT CIRCUITS

(71) Applicant: Avago Technologies General IP (Singapore) Pte. Ltd., Singapore (SG)

(72) Inventors: Reinier Van Der Lee, Lake Forest, CA (US); John Walley, Ladera Ranch, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 773 days.

(21) Appl. No.: 13/841,826

(22) Filed: Mar. 15, 2013

(65) Prior Publication Data

US 2014/0184152 A1 Jul. 3, 2014

Related U.S. Application Data

(60) Provisional application No. 61/747,091, filed on Dec. 28, 2012.

(51) Int. Cl.
*H02J 7/00* (2006.01)
*H02J 7/02* (2016.01)
*H02J 5/00* (2016.01)

(52) U.S. Cl.
CPC .............. *H02J 7/025* (2013.01); *H02J 5/005* (2013.01)

(58) Field of Classification Search
USPC ........................................................ 320/108
See application file for complete search history.

(56) References Cited

U.S. PATENT DOCUMENTS

| | | | |
|---|---|---|---|
| 2006/0113955 A1* | 6/2006 | Nunally | 320/108 |
| 2009/0289595 A1* | 11/2009 | Chen et al. | 320/108 |
| 2010/0026236 A1* | 2/2010 | Kamiyama et al. | 320/108 |
| 2011/0127954 A1* | 6/2011 | Walley et al. | 320/108 |

* cited by examiner

*Primary Examiner* — Samuel Berhanu
(74) *Attorney, Agent, or Firm* — Sterne, Kessler, Goldstein & Fox P.L.L.C.

(57) ABSTRACT

An apparatus and method are disclosed to control the mutual coupling between wireless power transfer (WPT) enabled devices. Wireless power transfer is best achieved when both the transmitting and receiving device are tuned to substantially the same frequency. Because WPT-enabled devices are coupled to one another during WPT, tuning one WPT-enabled device can cause both devices to converge to a resonance together. Furthermore, a WPT-enabled receiving device can be intentionally detuned to avoid coupling excessive power from a WPT-enabled transmitter device. These concepts can be extended to WPT-enabled device pairs that each has WPT transmission and reception qualities. When multiple WPT-enabled devices interact, tuning information can be stored in one or both of the devices to make the configuration procedure for subsequent WPT interactions more efficient. Various systems are presented to control the mutual coupling between WPT-enabled devices to improve the WPT.

20 Claims, 8 Drawing Sheets

POWER TRANSFER ARCHITECTURE EMPLOYING COUPLED RESONANT CIRCUITS

CROSS REFERENCE TO RELATED APPLICATIONS

This application claims the benefit of U.S. Provisional Patent Application No. 61/747,091, filed on Dec. 28, 2012, which is incorporated by reference herein in its entirety.

BACKGROUND

Field of Disclosure

The disclosure relates to wireless power transfer (WPT), and more specifically to improving WPT between WPT devices.

Related Art

Wireless power transfer (WPT) is a technology integrated into a variety of devices which require frequent battery recharging. For example, mobile devices such as smartphones, laptops, tablets, and peripheral devices such as wireless headsets, all have batteries that require recharging, sometimes on a daily basis. A device equipped with WPT can be charged without requiring the device to be plugged directly into a power source. As long as the WPT-enabled device remains in proximity to a WPT charger, the WPT-enabled device will continuously charge, assuming the battery is capable of taking additional charge. In this way, it is possible for an end user to use a WPT-enabled device, such as a laptop, which remains relatively stationary during ordinary operation, while eliminating all power cords, adapters, and outlets that would otherwise be necessary for operation. Therefore, WPT has been heralded not only as a convenience, but also as a "green" technology, in that the utility of several power cords can be consolidated into a single WPT charger serving multiple WPT-enabled devices.

The WPT charger and the WPT-enabled device employ inductive coupling between one another to charge wirelessly. The WPT charger generates a magnetic field by driving current through a coil. The WPT-enabled device utilizes power harvesting circuitry coupled to a complementary coil to deliver power to a rechargeable battery. The WPT-enabled device must regulate this power to not exceed the power handling capabilities of the battery load. The WPT-enabled device and the WPT charger are coupled through their respective coils, such that a mutual inductance and capacitance is formed between the devices. The mutual inductance between the devices is a result of loose coupling between the coils, that is, a mutual inductance having a coupling factor less than 0.5, while the mutual capacitance results from the separation between the conductive coil surfaces. The efficiency of the WPT is dependent on this mutual inductive as well as capacitive coupling and the resonant frequency characteristics of each device.

BRIEF DESCRIPTION OF THE DRAWINGS/FIGURES

Figure 1:
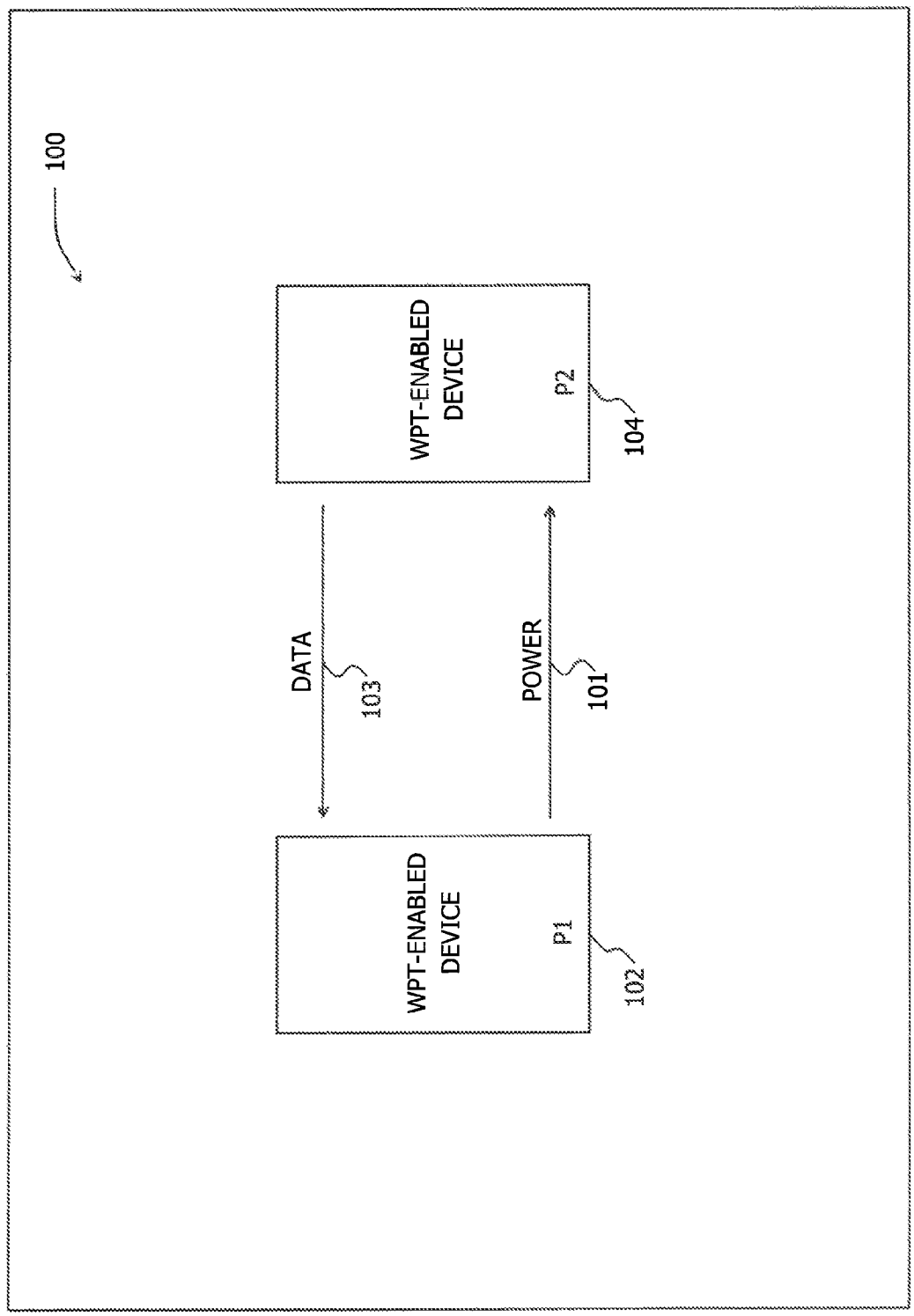
FIG. 1 illustrates a block diagram of a pair of coupled WPT-enabled devices according to an exemplary embodiment of the disclosure.

The disclosure will now be described with reference to the accompanying drawings. In the drawings, like reference numbers generally indicate identical, functionally similar, and/or structurally similar elements. The drawing in which an element first appears is indicated by the leftmost digit(s) in the reference number.

DETAILED DESCRIPTION OF THE DISCLOSURE

The following Detailed Description refers to accompanying drawings to illustrate exemplary embodiments consistent with the disclosure. References in the Detailed Description to "one exemplary embodiment," "an exemplary embodiment," "an example exemplary embodiment," etc., indicate that the exemplary embodiment described can include a particular feature, structure, or characteristic, but every exemplary embodiment can not necessarily include the particular feature, structure, or characteristic. Moreover, such phrases are not necessarily referring to the same exemplary embodiment. Further, when a particular feature, structure, or characteristic is described in connection with an exemplary embodiment, it is within the knowledge of those skilled in the relevant art(s) to affect such feature, structure, or characteristic in connection with other exemplary embodiments whether or not explicitly described.

The exemplary embodiments described herein are provided for illustrative purposes, and are not limiting. Other exemplary embodiments are possible, and modifications can be made to the exemplary embodiments within the spirit and scope of the disclosure. Therefore, the Detailed Description is not meant to limit the disclosure. Rather, the scope of the disclosure is defined only in accordance with the following claims and their equivalents.

Embodiments of the disclosure can be implemented in hardware, firmware, software, or any combination thereof. Embodiments of the disclosure can also be implemented as instructions stored on a machine-readable medium, which can be read and executed by one or more processors. A machine-readable medium can include any mechanism for storing or transmitting information in a form readable by a machine (e.g., a computing device). For example, a machine-readable medium can include non-transitory machine-readable mediums such as read only memory (ROM); random access memory (RAM); magnetic disk storage media; optical storage media; flash memory devices; and others. As another example, the machine-readable medium can include transitory machine-readable medium such as electrical, optical, acoustical, or other forms of propagated signals (e.g., carrier waves, infrared signals, digital signals, etc.). Further, firmware, software, routines, instructions can be described herein as performing certain actions. However, it should be appreciated that such descriptions are merely for convenience and that such actions in fact result from computing devices, processors, controllers, or other devices executing the firmware, software, routines, instructions, etc.

The following Detailed Description of the exemplary embodiments will so fully reveal the general nature of the disclosure that others can, by applying knowledge of those skilled in relevant art(s), readily modify and/or adapt for various applications such exemplary embodiments, without undue experimentation, without departing from the spirit and scope of the disclosure. Therefore, such adaptations and modifications are intended to be within the meaning and plurality of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in relevant art(s) in light of the teachings herein.

Although the description of the present disclosure is to be described in terms of WPT, those skilled in the relevant art(s) will recognize that the present disclosure can be applicable to other communication protocols that harvest power from an electromagnetic signal. For example, the present disclosure can be applicable to Radio-Frequency identification (RFID), or near-field communications (NFC).

Furthermore, although the Figures throughout the description illustrate series resonance for WPT, it will be apparent to those skilled in the art that the present disclosure can be adapted to encompass implementations of both series and parallel resonant tuning.

By way of example, the components as illustrated in the Figures referenced throughout the disclosure can be configured as a system on a chip (SoC), an integrated circuit (IC), a plurality of SoCs and/or ICs, or any combination thereof. It should be noted that any, some, or all of the functionality of the components as illustrated in the Figures referenced throughout the disclosure can be combined as part of a single device, or separated amongst multiple devices.

An Exemplary Wireless Power Transfer (WPT) Environment

FIG. 1 illustrates a block diagram of a pair of coupled WPT-enabled devices according to an exemplary embodiment of the disclosure. A WPT environment 100 illustrates wireless transfer of transferred power 101 and communication of data 103 between a first WPT-enabled device 102 and a second WPT-enabled device 104 that are sufficiently proximate to each other. The first WPT-enabled device 102 and the second WPT-enabled device 104 are loosely coupled to one another through a mutual coupling. The devices are not limited to loose coupling, as strong coupling may exist. The first WPT-enabled device 102 and the second WPT-enabled device 104 can communicate with one another through a communication link. The first WPT-enabled device 102 and/or the second WPT-enabled device 104 can utilize the communication link separate from, or in combination with, the WPT communication of data 103. The communication link can be separate, or implemented as a part of the mutual coupling. The term "WPT communication" can include the transfer of transferred power 101 and/or the exchange of the data 103.

The first WPT-enabled device 102 and/or the second WPT-enabled device 104 may be implemented as a stand-alone accessory, incorporated within or coupled to another electrical device or host device, such as a mobile telephone, a portable computing device, another computing device such as a laptop or a desktop computer, a computer peripheral such as a printer, a portable audio and/or video player, a toy, a game, and/or any other suitable electronic device that will be apparent to those skilled in the relevant art(s) without departing from the spirit and scope of the disclosure.

The efficiency of the wireless power transfer between the first WPT-enabled device 102 and the second WPT-enabled device 104 is based on the quality of the mutual coupling and/or the characteristics of the transferred power 101. The quality of the mutual coupling and/or the characteristics of the transferred power 101 are influenced by the operating parameters P1 and P2. Although the operating parameters P1 and P2 are associated with separate WPT-enabled devices, variations in either operating parameter P1 or P2 can influence the other since both the first WPT-enabled device 102 and the second WPT-enabled device 104 are loosely coupled through the mutual coupling. The devices are not limited to loose coupling, as strong coupling may exist. The first WPT-enabled device 102 and the second WPT-enabled device 104 can communicate the operating parameter P1 and P2 to one another as the data 103.

The first WPT-enabled device 102 can detect, measure, and/or store data associated with the WPT efficiency and/or the characteristics of the transferred power 101. Based on the WPT efficiency and/or the characteristics of the transferred power 101, the first WPT-enabled device 102 can adjust the operating parameter P1, which influences the operating parameter P2, to adjust the WPT efficiency and/or the characteristics of the transferred power 101. The first WPT-enabled device can store the operating parameters P1 and/or P2, a record of any adjustments made to the operating parameters P1 and/or P2, and/or a history of the WPT efficiency and/or the characteristics of the transferred power 101 which result from the adjustments made to the operating parameters P1 and/or P2.

The second WPT-enabled device 104 can likewise detect, measure, and/or store data associated with the efficiency of the WPT and/or the characteristics of the transferred power 101. Based on the efficiency and/or the characteristics of the transferred power 101, the second WPT-enabled device 104 can adjust the operating parameter P2, which influences the operating parameters P1, to adjust the WPT efficiency and/or the characteristics of the transferred power 101. The second WPT-enabled device 104 can store the operating parameters P1 and/or P2, a record of any adjustments made to P1 and/or P2, and/or a history of the WPT efficiency and/or the characteristics of the transferred power 101 which result from the adjustments made to P1 and/or P2.

An Exemplary Coupled WPT-Enabled Transmitter and Receiver Pair

Figure 2:
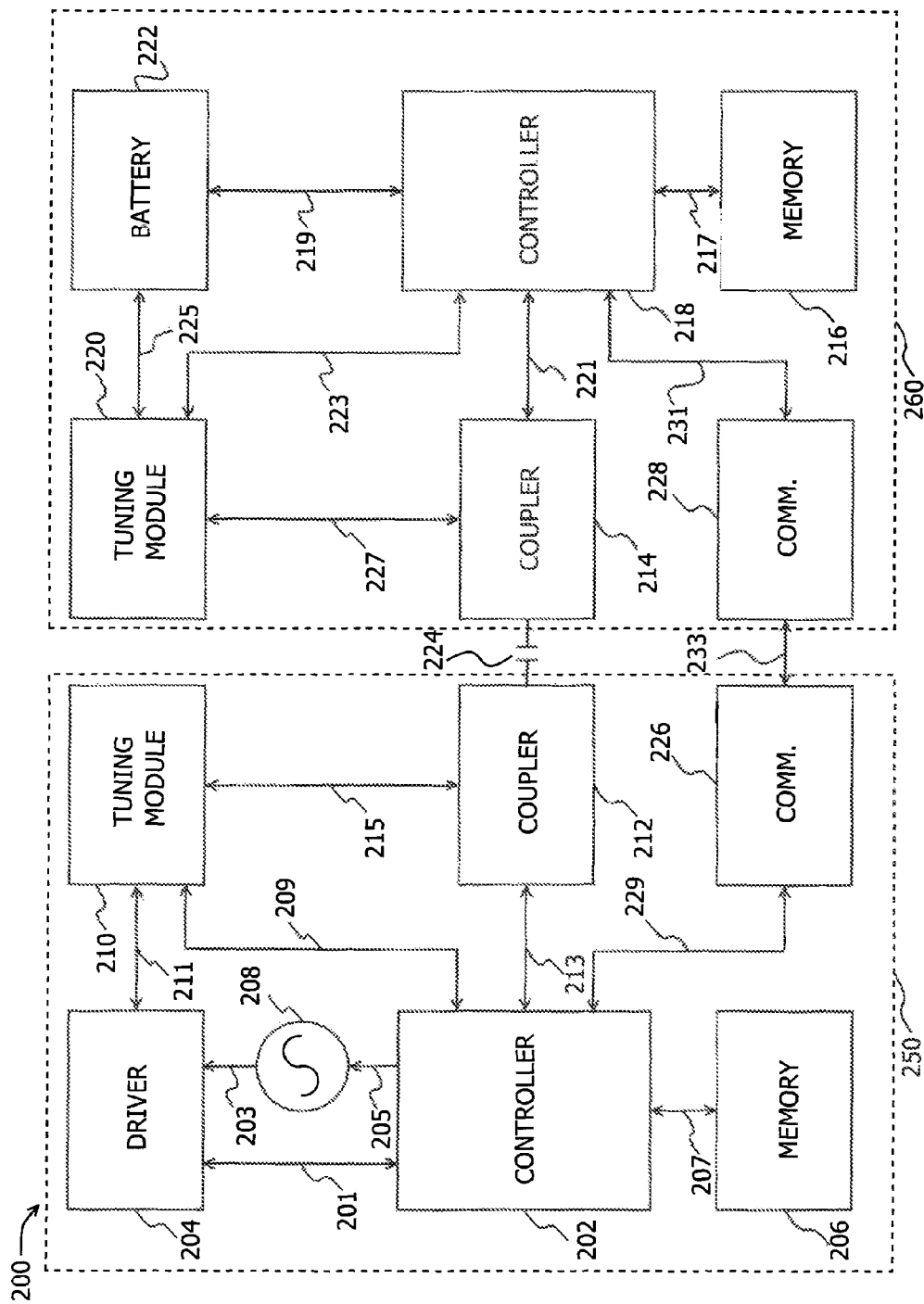
FIG. 2 illustrates a block diagram of a coupled WPT-enabled transmitting device and a WPT-enabled receiving device according to an exemplary embodiment of the disclosure.

FIG. 2 illustrates a block diagram of a coupled WPT-enabled transmitting device and a WPT-enabled receiving device according to an exemplary embodiment of the disclosure. FIG. 2 illustrates a block diagram of a WPT transmit/receive pair 200. WPT transmit/receive pair 200 includes a WPT-enabled transmitting device 250 coupled to a WPT-enabled receiving device 260 via a coupling 224.

The WPT-enabled transmitting device 250 includes a controller module 202, a driver module 204, a memory module 206, an oscillator module 208, a tuning module 210, a communications module 226, and a coupler module 212.

The WPT-enabled transmitting device 250 can represent an exemplary embodiment of the first WPT-enabled device 102.

The controller module 202 can monitor and/or control communications and/or operational functions of the WPT-enabled transmitting device 250. The controller module 202 can include, for example, a single controller, or a collection of controllers, software, and/or hardware including any number of analog-to-digital converters, any number of digital-to-analog converters, a modulator, and/or a demodulator. The controller module 202 can be implemented using any suitable means to perform communications and/or operational functionality of the WPT-enabled transmitting device 250 that will be apparent to those skilled in the relevant art(s) without departing from the spirit and scope of the present disclosure.

The controller module 202 can communicate, measure, calculate, sample, and/or control a functionality, setting, and/or operational parameter of the driver module 204, the oscillator module 208, the tuning module 210, the memory module 206, the communications module 226, and/or the coupler module 212 via a controller-driver bus 201, a controller-oscillator bus 205, a controller-tuning module bus 209, a controller-memory bus 207, a controller-communications module bus 229, and a controller-coupler bus 213, respectively.

A log of the history of the communications between the driver module 204, the oscillator module 208, the tuning module 210, the memory module 206, the communications module 226, and/or the coupler module 212 can also be stored in the memory module 206. The controller module 202 can store data indicative of the functionality, and/or settings of the driver module 204, the oscillator module 208, the tuning module 210, the memory module 206, the communications module 226, and/or the coupler module 212 in the memory module 206. In this way, an entire history of the wireless power transfer interaction between the WPT-enabled transmitting device 250 and the WPT-enabled receiving device 260, can be stored and later accessed from the memory module 206 using the controller-memory bus 207.

The driver module 204 can provide a power signal for wireless power transfer to the coupler module 212 via the driver-tuning module bus 211, the tuning module 210, and the tuning module-coupler bus 215. The driver module 204 can be implemented using any suitable means to provide a power signal with an adjustable frequency, current, voltage, and/or power level to the coupler module 212, which can include a group of coupler modules, that will be apparent to those skilled in the relevant art(s) without departing from the spirit and scope of the present disclosure.

The driver module 204 can provide the power signal at a resonant frequency, or band of frequencies, utilizing a reference signal provided by the oscillator module 208 via oscillator-driver bus 203. The magnitude of the power signal provided by the driver module 204 can be measured and/or controlled by the controller module 202, for example, by measuring and/or controlling a current and/or voltage output by the driver module 204. The controller module 202 can adjust the resonant frequency, or band of frequencies, of the power signal by adjusting the resonant frequency, or band of frequencies, of the oscillator module 208. It should be noted that although the driver module 204 is illustrated in FIG. 2 as a single module, the disclosure should not be interpreted as so limiting. The driver module 204 can include any number of amplifiers and/or switches, configured for single and/or differential mode of operation.

The oscillator module 208 can be implemented using any number of crystal oscillators, numerically controlled oscillators, registers, analog-to-digital converters (ADCs), digital-to-analog converters (DACs), amplifiers, phase-locked-loops (PLLs), digital direct synthesizers (DDSs) or any suitable means to provide an adjustable reference signal for the generation of a power signal by the driver module 204 that will be apparent to those skilled in the relevant art(s) without departing from the spirit and scope of the present disclosure. The oscillator module 208 can provide a reference signal having a single resonant frequency, multiple resonant frequencies, or a band of frequencies which can be adjusted by the controller module 202 via the controller-oscillator bus 205.

The coupler module 212 can convert the power signal provided by the driver module 204 via the tuning module 210 to a magnetic field. For example, if the driver module 204 is an adjustable current driver, the coupler module 212 can include a wire loop element. In this example, the coupler module 212 would provide a magnetic field of intensity proportional to the magnitude of the current provided by the driver module 204 through the loop coil. The coupler module 212 can include an inductive coupling element, for example, the inductance of which can be controlled and adjusted by the controller module 202 via the controller-coupler bus 213. The coupler module 212 can provide a variable impedance between the tuning module 210 and the coupler 214. In this way, the coupler module 212 can provide an adjustable frequency response to modify the power signal which passes through the coupler module 212 via the tuning module-coupler bus 215 to the coupler module 214.

The tuning module 210 can provide a variable impedance between the driver module 204 and the coupler module 212. The tuning module 210 can include, for example, components which can be switched to provide a variable impedance at intervals proportional to the frequency of the power signal provided by the driver module 204. Any, some, or all of the components included as part of the tuning module 210 can be adjusted by the controller module 202 via a controller-tuning module bus 209. In this way, the tuning module 210 can provide an adjustable frequency response to modify the power signal which passes through the tuning module 210 via the driver-tuning module bus 211 to the coupler via the tuning module-coupler bus 215.

The communications module 226 can provide additional communications and/or capabilities for the WPT-enabled transmitting device 250, which can be out-of-band communications with respect to the resonant frequency of operation of the WPT, and use non-WPT type communications standards. For example, the communications module 226 can enable near field communications (NFC) between the WPT-enabled transmitting device 250 and the WPT-enabled receiving device 260. Additional communication functionality can also include Wi-Fi and/or BLUETOOTH communications, for example. The controller module 202 can control and communicate with the communications module 226 via the controller-communication module bus 229. The data received by the controller module 202 via the driver module 204 can alternatively, or additionally, be received via the communications module 226.

The WPT-enabled receiving device 260 can communicate with a WPT-enabled device, such as the WPT-enabled transmitting device 250, for example, using the communications module 228 and a communications link 233. If both the WPT-enabled receiving device 260 and the WPT-enabled transmitting device communicate in this way, the operating parameters P1 and/or P2 of the WPT-enabled receiving device 260 and/or the WPT-enabled transmitting device 250, for example, can be shared through such an out-of-band communication. For example, if both the WPT-enabled receiving device 260 and the WPT-enabled transmitting device 250 have NFC functionality, the devices can communicate via NFC when brought in proximity and exchange operating parameters P1 and/or P2 through the NFC connection.

The memory module 206 can be configured to store the data read by the controller module 202 and to allow access to the stored data by the controller module 202. The memory module 206 can include, for example, an SRAM, DRAM, and/or a non-volatile memory. Data received by the controller module 202 and stored in the memory module 206 can include, for example, various operating parameters P1 and/or P2 related to the WPT-enabled transmitting device 250, or another WPT-enabled device, such as the WPT-enabled receiving device 260.

The operating parameters related to the WPT-enabled transmitting device 250 and/or the WPT-enabled receiving device 260 can include, for example: a current, voltage, phase, frequency, and/or power level of a signal generated and/or received by any, some, or all of the components included in the WPT-enabled transmitting device 250 and/or the WPT-enabled receiving device 260, such as device identification, configuration, power transfer efficiency, device functionality, status, and/or capabilities of the WPT-enabled transmitting device 250 and/or the WPT-enabled receiving device 260. To provide another example, the operating parameters related to the WPT-enabled transmitting device 250 and/or the WPT-enabled receiving device 260 can include WPT standards supported, wireless communications standards supported, a total power available for a wireless transfer, a resonant frequency and/or power level of the power signal provided by the driver module 204, the tuning module 210, and/or the coupler module 212, tuning settings and/or frequency response information associated with the tuning module 210 and/or the coupler module 212, a coupling factor between the transmitting WPT-enabled transmitting device 250 and the WPT-enabled receiving device 260, metal content, resonant frequencies and/or frequency bands associated with the driver module 204, the tuning module 210, and/or the coupler module 212, power status, serial number, model number, and/or device type. To provide further examples, the operating parameters can also include communication related information, such as communication infrastructure information, networking information, hosted services, network or IP addresses, user information, and/or security information such as encryption keys.

The WPT-enabled receiving device 260 includes a controller module 218, a battery module 222, a memory module 216, a tuning module 220, a communications module 228, and a coupler module 214. The WPT-enabled receiving device 260 can represent an exemplary embodiment of the second WPT-enabled device 104. The functionality of the controller module 218, the memory module 216, the tuning module 220, the communications module 228, and the coupler module 214 are substantially similar to the functionality of the controller module 202, the memory module 206, the tuning module 210, the communications module 228, and the coupler module 214, respectively, as previously described with reference to the first WPT-enabled transmitting device 250. Therefore, only differences between the first WPT-enabled transmitting device 250 and the second WPT-enabled receiving device 260 will be described herein.

The controller module 218 can communicate with, measure, calculate, sample, and/or control a functionality, setting, and/or operational parameter of the battery module 222, via a controller-battery module bus 219. A log of the history of the communications between the battery module 222 can be stored in the memory module 216. The controller module 218 can store data indicative of the functionality, and/or settings of the battery module 222, in the memory module 216. The operational parameter P2 can include information related to the operation, status, and functionality of the battery module 222.

The tuning module 220 can provide a variable impedance between the battery module 222 and the coupler module 214 to provide a charging signal to the battery module 222 via the tuning module-battery bus 225. In this way, the tuning module 220 can provide an adjustable frequency response to modify the power signal which passes through the tuning module 220 via a tuning module-coupler bus 227 to the battery module 222.

The tuning module 220 can regulate and condition the power signal, using current shunting, and/or voltage regulation, for example. The tuning module 220 can communicate with the controller module 218 via a controller-tuning module bus 223. The charging signal provided by the tuning module 220 can be a variable current and/or voltage depending on the requirements of the battery module 222. The charging signal can be adjusted by the controller module 218 based on a feedback signal the controller module 218 receives from the battery module 222. In this way, the controller module 218 can provide the proper current, voltage, and/or power levels to the battery module 222 to ensure a safe and efficient battery charge.

The battery module 222 can provide any, some, or all of the power required by the WPT-enabled receiving device 260. The battery module 222 can be a single battery or a group of batteries, such as a battery pack, for example. The battery module 222 can include a rechargeable battery, for example, such as a Lithium-Ion (Li-ion) or Nickel Metal Hydride (NiMH) battery. The battery module 222 can provide power to other components of device which incorporates the WPT-enabled receiving device 260, such as a laptop or mobile phone, for example. The battery module 222 can provide power to these other components in addition to, separate from, or in combination with any, some, or all of the components of the WPT-enabled receiving device 260.

The battery module 222 can be recharged by the charging signal and provide a feedback signal to the controller module 218 via the controller-battery module bus 219. The feedback signal can include, for example, present battery capacity and/or overall battery capacity, a charge status, power handling requirements, required power to complete a charge cycle, and/or safety shutdown information such as an overheating condition.

During a WPT, the WPT-enabled transmitting device 250 wirelessly transfers power to the WPT-enabled receiving device 260 through the coupling 224. Due to the coupling 224, the frequency response characteristics of both the WPT-enabled transmitting device 250 and the WPT-enabled receiving device 260 are "linked" together, with changes to either of the WPT-enabled devices impacting the other. The WPT is most efficient when the WPT-enabled transmitting device 250 and the WPT-enabled receiving device 260 have similar frequency responses. Therefore, the coupling 224 can be exploited to cause the frequency response of the WPT-enabled transmitting device 250 and the WPT-enabled receiving device 260 to converge or diverge by changing an operating parameter of only one of the devices.

For example, the driver module 204 can provide a power signal at a resonant frequency ft through the coupling 224 to the WPT-enabled receiving device 260. The frequency response of the coupler module 214, the tuning module 220, and the battery module 222 can collectively have a resonant frequency response fr that deviates from ft such that only a small amount of the power transmitted by the WPT-enabled transmitting device 250 is capable of being converted by the WPT-enabled receiving device 260, resulting in a poor WPT efficiency.

By adjusting the frequency ft, to approach fr, both the WPT-enabled transmitting device 250 and the WPT-enabled receiving device 260 can converge to resonate at a mutual frequency fm. In other words, the mutual coupling between the devices includes a mutual impedance which varies with changes to either the resonant frequency ft and/or the frequency response fr. By adjusting either ft or fr, therefore, varies this mutual impedance. The change in this mutual impedance, in turn, forces the other WPT-enabled device to vary its frequency response, since the frequency response of either individual WPT-enabled device is also a function of the shared impedance between the devices. By varying either ft and/or fr, the wireless power transfer efficiency can be adjusted.

To provide another example, the controller module 202 can adjust the frequency response of the tuning module 210 and/or the coupler module 212 such that the overall frequency response of the WPT-enabled transmitting device 250 and the WPT-enabled receiving device 260 converge to a mutual frequency response having an improved wireless power transfer efficiency, or diverge to decrease the wireless power transfer efficiency. The controller module 202 can make such adjustments while the WPT-enabled receiving device 260 provides no adjustments to the tuning module 220 and/or the coupler module 214. Similarly, the controller module 218 can make adjustments to the tuning module 220 and/or the coupler module 214 to improve or reduce efficiency while the WPT-enabled transmitting device 250 provides no adjustments. Finally, both the WPT-enabled transmitting device 250 and the WPT-enabled receiving device 260 can make adjustments to the frequency and/or frequency response of their respective components to control the wireless power transfer efficiency.

Various operating parameters can be measured by the controller module 202 and/or the controller module 218 and correlated to the adjustments made to the frequency and/or frequency response of their respectively controlled components. The controller module 202, for example, can sample a current, voltage, and/or power output by the driver module 204 over time. Based on this sampling, the controller module 202 can calculate a rate and direction of change of the output current, voltage, and/or power to detect a peak output level corresponding to a particular frequency and/or frequency response of the driver module 204, the tuning module 210, and/or the coupler module 212. Similarly, the controller module 218 can track changes in the current, voltage, and/or power of the charging signal that charges the battery module 222 and/or any changes to the power signal coupled through the coupler module 214. Based on this tracking, the controller module 218 can calculate a rate and direction of change of the measured signal to detect a peak level corresponding to a particular frequency response of the tuning module 220 and/or the coupler module 214.

The controller module 202 and the controller module 218 can communicate with one another through the coupling 224 through load modulation by the WPT-enabled receiving device 260, for example, and/or through the communications link 233. Based on comparisons of the power transmitted by the WPT-enabled transmitting device 250 and the power received by the WPT-enabled receiving device 260, mutual operating parameters such as WPT efficiency and/or a coupling factor associated with the coupling 224 can be determined by the controller module 202 and/or the controller module 218. In this way, the controller module 202 and the controller module 218 can adjust the frequency and/or frequency response of their respectively controlled components, either individually or in combination, to adjust the WPT efficiency.

Figure 3:
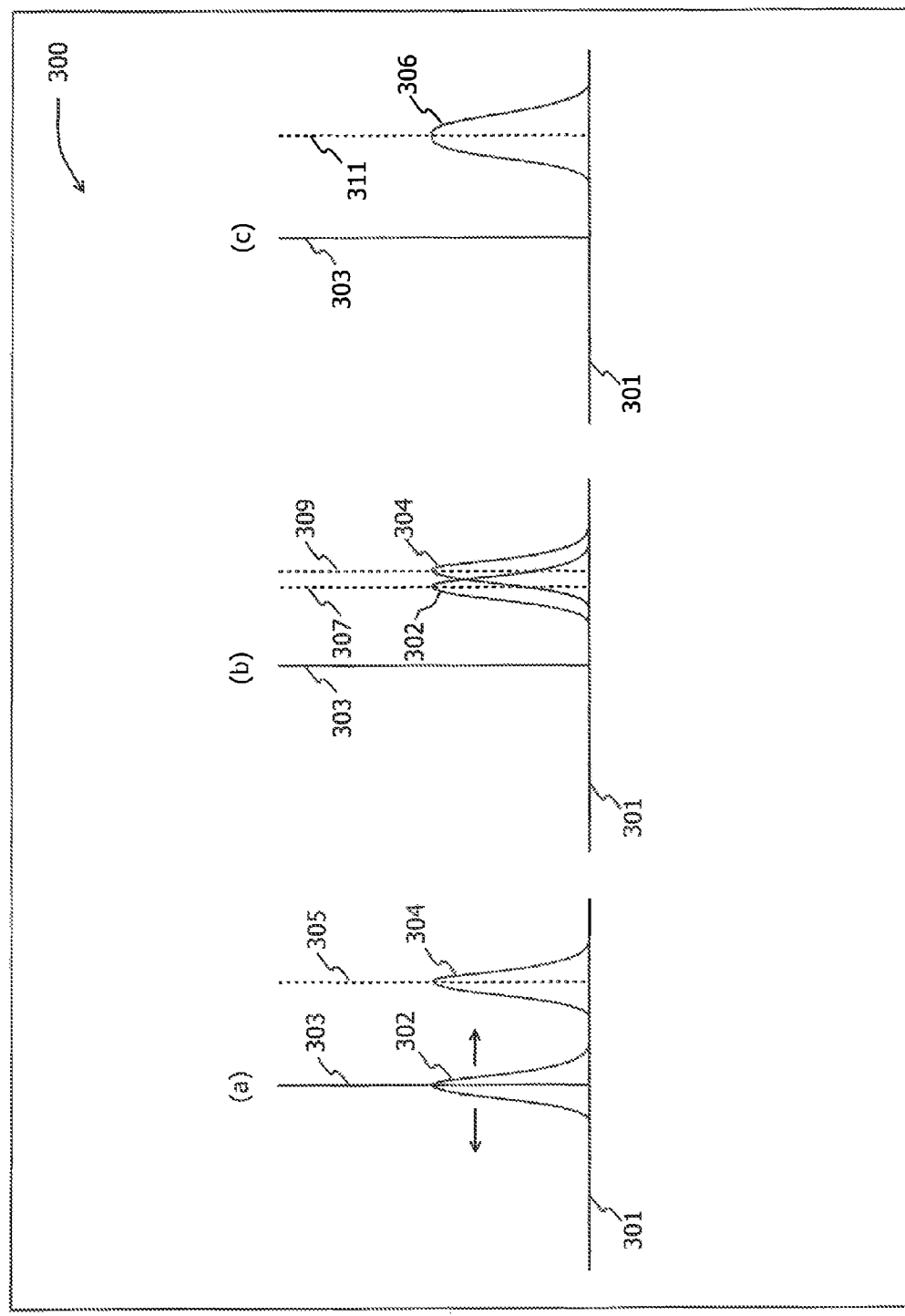
FIG. 3 illustrates a block diagram of the resonant frequency characteristics of a pail of coupled WPT-enabled devices according to an exemplary embodiment of the disclosure.

An Exemplary Resonant Frequency Interaction Between a WPT-Enabled Transmitter and Receiver Pair FIG. 3 illustrates a block diagram of the resonant frequency characteristics of a pair of coupled WPT-enabled devices according to an exemplary embodiment of the disclosure. FIG. 3 illustrates typical resonant frequency response steps 300 of a WPT-enabled transmit/receive pair. The WPT-enabled transmit and receive pair can represent an exemplary embodiment of the WPT transmit/receive pair 200. Resonant frequency response steps 300 include steps (a) through (c) which include a frequency axis 301, a power signal 302, a receiver response 304, and a mutual frequency response 306.

Resonant frequency response step (a) illustrates a resonant frequency 303 of a typical WPT power signal 302. The power signal 302 can be generated by the WPT-enabled transmitting device 250 and has a resonant frequency 303 which can be controlled by the oscillator module 208, for example. The receiver response 304 is an illustration of the frequency response which can include a combination of components associated with the WPT-enabled receiving device 260, such as the coupler module 214, the tuning module 220, and the battery module 222, for example. The receiver response 304 has a second resonant frequency 305 which is different from the resonant frequency 303. Because WPT is most efficient when the resonant frequencies of the power signal 302 and the receiver response 304 are substantially the same, the WPT-enabled transmitting device 250 can adjust the resonant frequency of the power signal to improve the WPT efficiency.

Resonant frequency response step (b) illustrates the power signal 302 shifted in resonance to resonant frequency 307. This resonance shift can be a result of the controller module 202 adjusting the frequency of the oscillator module 208, for example. The receiver response 304 has a second resonant frequency 309 which is closer to the resonant frequency 307 than in step (a), as the receiver response 304 is "pulled" closer to the resonant frequency 307. Step (b) illustrates an improved WPT efficiency over step (a) due to the overlap in the power signal 302 and the receiver response 304.

Resonant frequency response step (c) illustrates a merging of the resonance of the power signal 302 and the receiver response to the same resonant frequency 311. Although the mutual frequency response 306 can result from the resonance of the power signal 302 matching the resonance of the receiver response 304, a precise match is not necessary. Rather, mutual frequency response 306 can be a result of the WPT-enabled transmitting device 250 pulling the resonance of the receiver response 304 to this mutual frequency response 306 due to the coupling between the WPT transmitter/receiver pair. In other words, there is a range of frequencies in which the WPT transmitter/receiver pair will share a mutual frequency response 306. This mutual frequency response 306 occurs when the resonant frequencies of the WPT-enabled transmitter/receiver pair are close enough together such that the mutual inductance between the couplers and the impedance of the various tuned components associated with each of the individual WPT-enabled devices are sufficiently matched. Over this range of impedance matching, the WPT-enabled transmitter/receiver pair acts as a single impedance resonating at a common resonant frequency.

Figure 6:
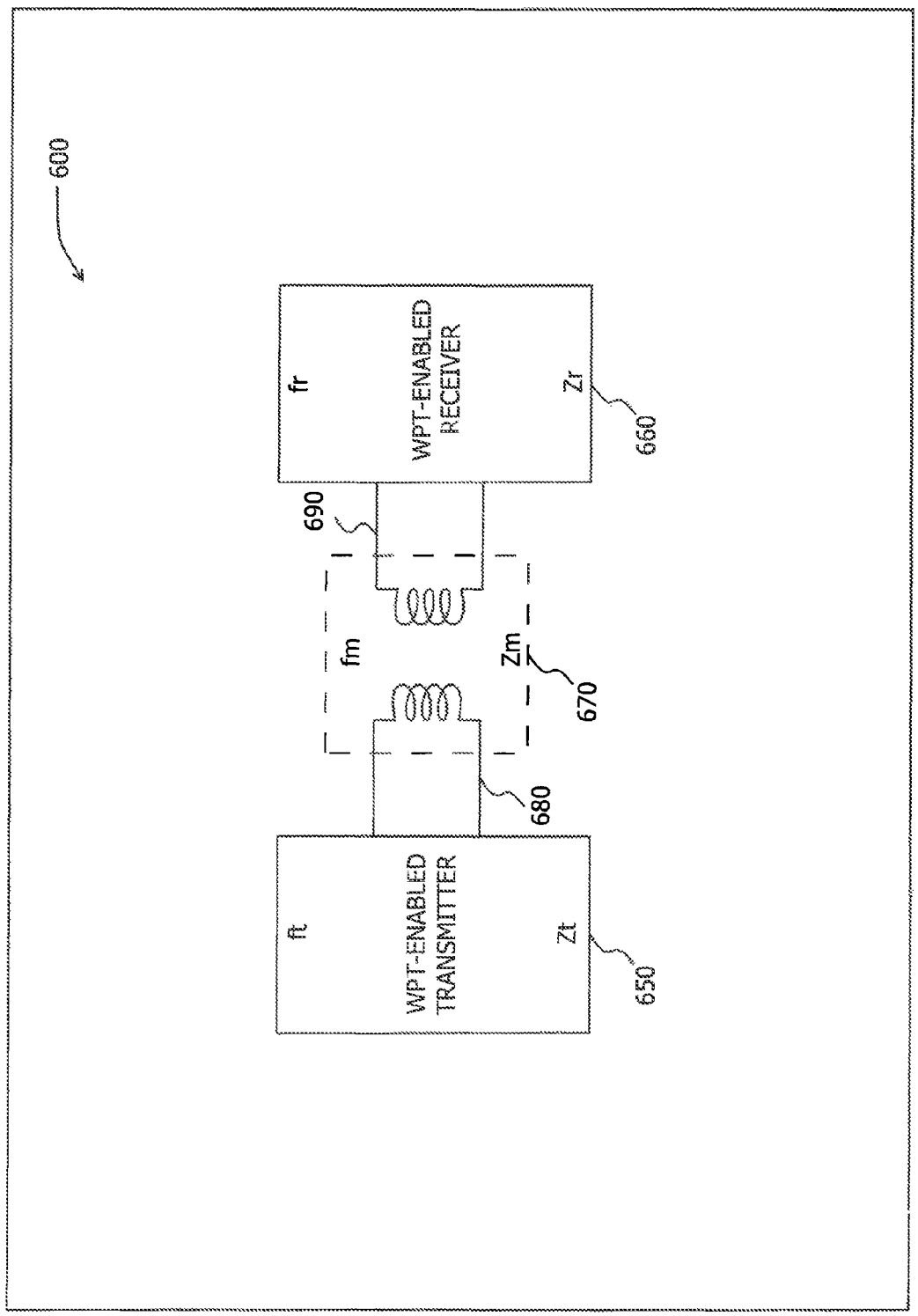
FIG. 6 illustrates a mutual impedance interaction between a pair of coupled WPT-enabled devices according to an exemplary embodiment of the disclosure.

To further clarify the steps (a) through (c), FIG. 6 illustrates an example of the interaction between a WPT-enabled transmitter 650 and a WPT-enabled receiver 660. The WPT-enabled transmitter 650 and the WPT-enabled receiver 660 can be exemplary embodiments of the WPT-enabled transmitting device 250 and the WPT-enabled receiving device 260, respectively. The WPT-enabled transmitter 650 transmits a power signal through a coupler 680 having a resonant frequency ft, and an impedance Zt which includes, for example, the impedance of the coupler 680 and the mutual impedance Zm. The WPT-enabled receiver 660 receives the power signal through a coupler 690 according to a frequency response fr which is a function of the impedance Zr, which includes, for example, the impedance of the coupler 690 and the mutual impedance Zm. The mutual impedance Zm is a result of the mutual coupling between the coupler 680 and the coupler 690. Because of this shared mutual impedance Zm, changes to either the resonant frequency ft or the impedance Zt will cause the frequency response fr to shift according to changes to the mutual impedance Zm. By varying the resonant frequency ft or the impedance Zt, therefore, the resonant frequency ft and the frequency response fr can merge to a mutually resonant frequency fm.

It should be noted that although FIG. 3 indicates that the resonant frequency of the WPT-enabled transmitting device 250 is varied while the receiver response 304 is held constant, the disclosure should not be interpreted as so limiting. The WPT-enabled transmitting device 250 can maintain the resonant frequency of the power signal 302 while the WPT-enabled receiving device 260 adjusts its receiver response 304, for example. The WPT-enabled transmitting device 250 can maintain the resonant frequency of the power signal 302 while adjusting the frequency response of the WPT-enabled transmitting device 250, by adjusting settings associated with the driver module 202, the tuning module 210, and/or the coupler module 212, for example. The resonant frequency and/or the frequency response of the WPT-enabled transmitting device 250 and/or the frequency response associated with the receiver response 304 can be adjusted in any combination, simultaneously, or separately, to achieve mutual frequency response 306.

It should also be noted that although steps (a) through (c) are illustrated in FIG. 3 as sequentially taking place to improve WPT efficiency, the WPT-enabled transmitting device 250 and/or the WPT-enabled receiving device 260 can perform the steps in any order. In other words, while the power signal output from the coupler module 212 is at a constant output level, the charge signal delivered to the battery module 222 is dependent mainly on the WPT efficiency. Therefore, the charge signal can be controlled not only by adjusting the power output of the power signal, but by controlling the WPT efficiency. In this way, the power delivered to the battery module 222 can be increased by increasing the WPT efficiency, or decreased, by decreasing the WPT efficiency, if no changes to the power output of the power signal are desired to be made. Therefore, the WPT-enabled transmitting device 250 and/or the WPT-enabled receiving device 260 can decrease the power delivered to the battery module 222 via a decreased WPT efficiency by detuning, or separating, the resonant frequency responses of the devices.

The WPT-enabled transmitter/receiver pair mutual frequency response 306 is advantageously stable. That is, once the mutual frequency response 306 is obtained and the WPT-enabled transmitter/receiver pair are operating at the mutually resonant frequency fm, the WPT-enabled transmitter/receiver pair will remain "locked" in this state. In other words, with the exception of large variations in the resonant frequency ft, the frequency response fr, the impedance Zt and/or the impedance Zr, the shared impedance Zm and the mutual coupling between the WPT-enabled transmitter/receiver pair forces a stable mutual resonant state. Therefore, because of the coupling between the WPT-enabled transmitter/receiver pair and the hysteretic properties of their mutual frequency response 306, the WPT-efficiency between the WPT-enabled transmitter/receiver pair can be adjusted and then maintained by making frequency adjustments only at the WPT-enabled transmitting device 250 or the WPT-enabled receiving device 260.

An Exemplary Coupler and Tuning Module in a WPT-Enabled Receiving Device

Figure 4A:
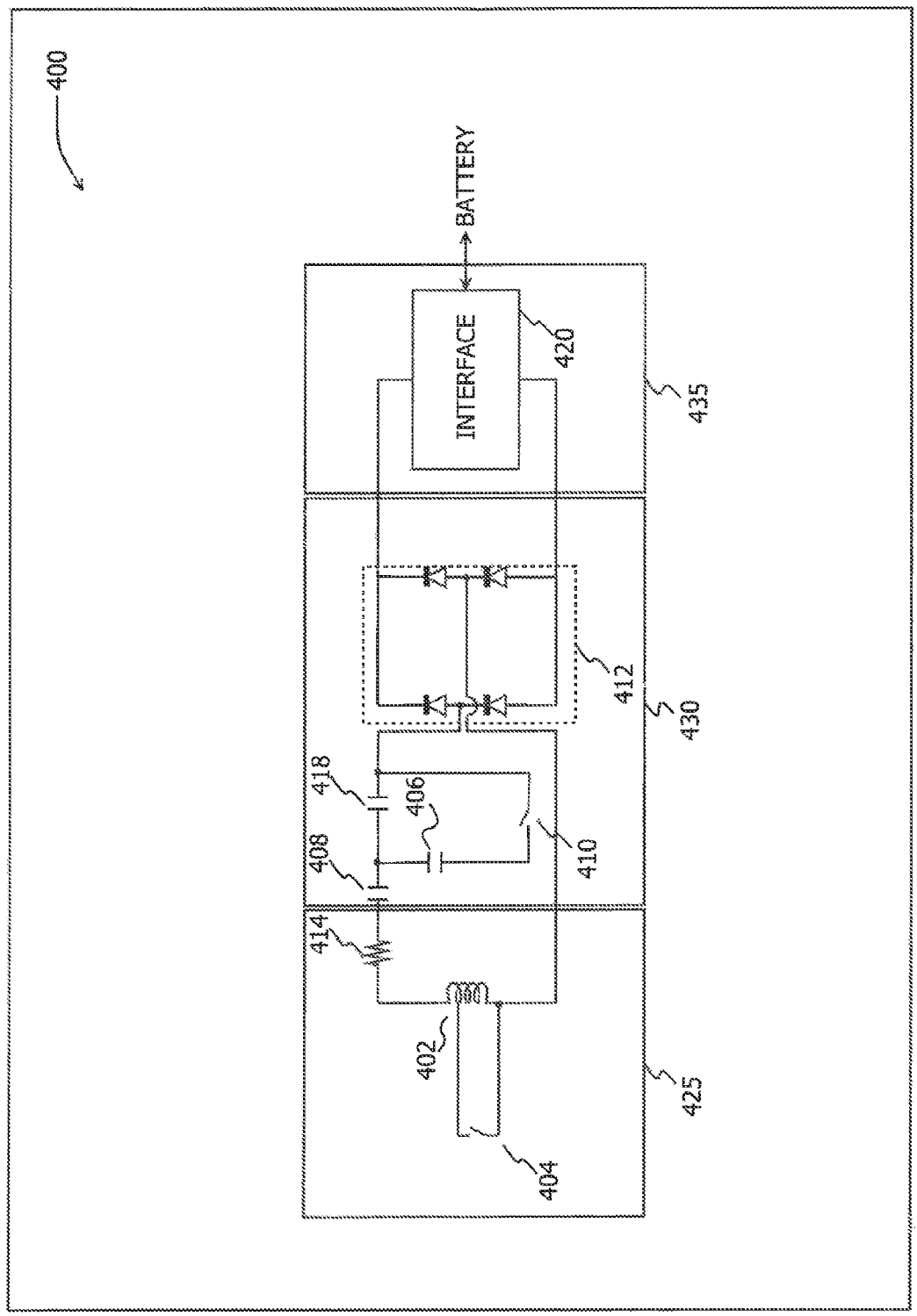
FIG. 4A illustrates a first coupler and tuning module implementation of a WPT-enabled receiving device according to an exemplary embodiment of the disclosure.

FIG. 4A illustrates a first coupler and tuning module implementation of a WPT-enabled receiving device according to an exemplary embodiment of the disclosure. Tuning system 400 includes a coupler module 425, a tuning module 430, and an interface module 435. The coupler module 425 can represent an exemplary embodiment of the coupler module 214. The tuning module 430 can represent an exemplary embodiment of the tuning module 220. The interface module 435 can represent an exemplary embodiment of an interface between the tuning module 220 and the battery module 222.

The coupler module 425 includes coupling element 402, resistive element 414, and switch 404. The coupling element 402 can couple the wireless power signal to the remainder of the coupler module 425. The switch 404 can vary an inductance of the coupling element 402 by shorting a portion of the coupling element 402. The resistive element 414 provides current limiting and impedance matching between the coupling element 402 and the capacitor 408.

The tuning module 430 includes a bridge 412, capacitors 406, 408, and 418, and a switch 414. The bridge 412 rectifies the power signal received from the coupler module 425 and transfers the rectified power signal to the interface module 435. The capacitors 406, 408, and 418 can control a frequency response of the tuning module 430.

The capacitors 408 and 418 can transfer the coupled power signal between the coupling element 402 and the tuning module 430. The switch 410 can vary the frequency response of the tuning module 430 by adding additional capacitance in parallel with capacitor 418 by connecting or disconnecting the capacitor 406. The capacitance of the capacitors 406, 408, and 418, and the inductance of the coupling element 402, together control the overall frequency response of the tuning system 400.

The inductance of the coupling element 402 and/or the overall capacitance of capacitors 406, 408, and 418 can be additionally adjusted by respectively switching the switches 404 and 410 on or off at a particular frequency and duty cycle. A controller, such as the controller module 218, for example, can switch the state of the switches 404 and 410 at a frequency that is proportional to the frequency of the power signal. In other words, by controlling the frequency and duty cycle of the conducting state of the switches 404 and 410, the controller can control the reactance of switched reactance elements including the coupling element 402 and/or the overall capacitance represented by capacitors 406, 404, and 418.

For example, the controller can switch the inductance of the coupling element 402 on and off at a rate that is twice the frequency of the power signal, timing the switching to occur at the peaks and troughs of the power signal. Changing the inductance of the coupling element 402 in this periodic fashion alters the frequency response of the tuning system 400 by increasing the resonant frequency. Similarly, switching the capacitances of capacitor 410 in this periodic manner decreases the resonant frequency associated with the frequency response of the tuning system 400. Therefore, by controlling, the switching timing to periodically add and remove the reactances in the tuning system 400 at precise intervals, a switched fixed reactance is equivalent to a variable reactance. In this way, a frequency response of the tuning system 400 can be adjusted without the need of variable discreet components.

The interface module 435 includes an interface block 420. Interface block 420 can control, communicate, provide power regulation, and/or transfer the power signal to a battery, such as battery 222.

Figure 4B:
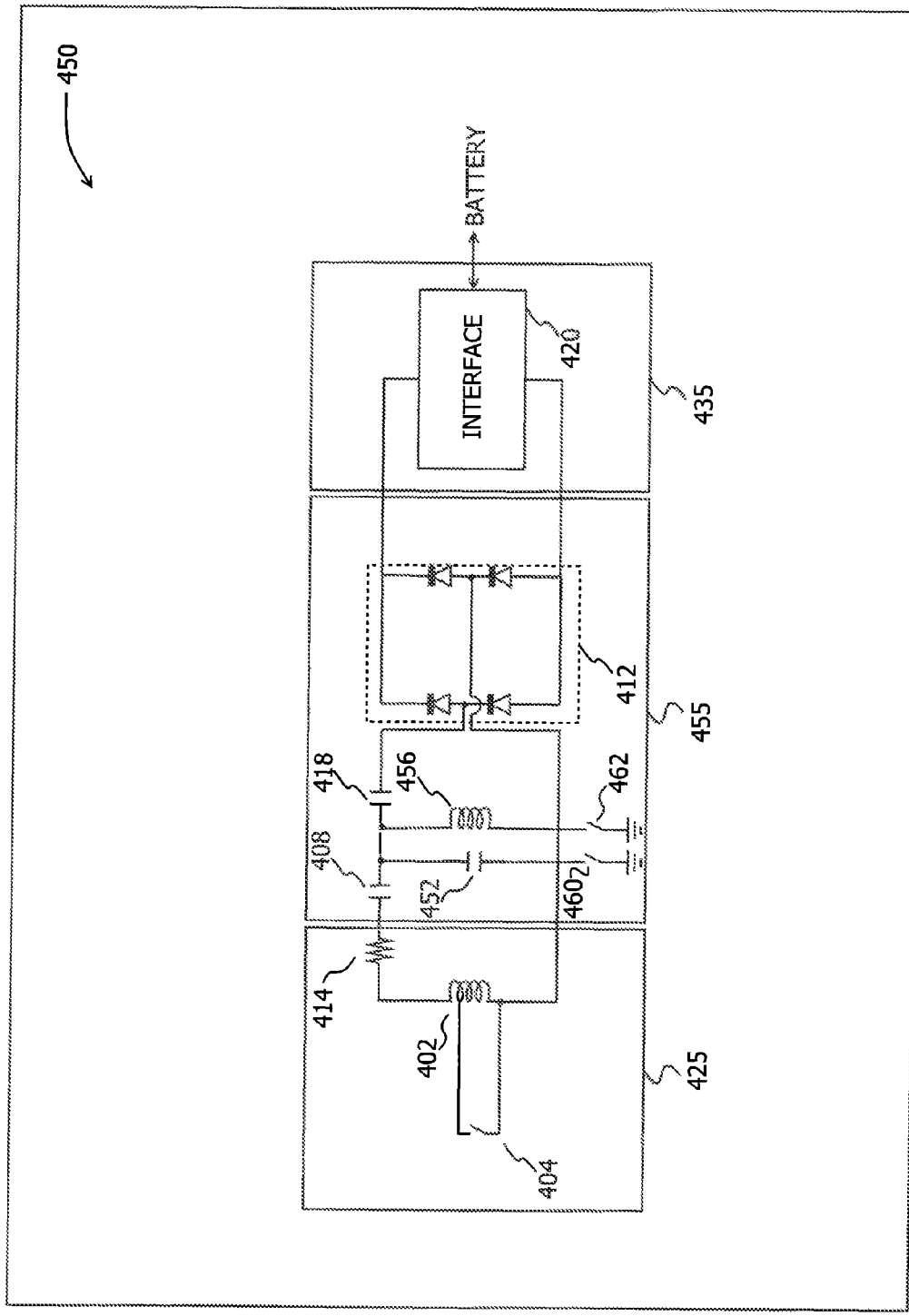
FIG. 4B illustrates a second coupler and tuning module implementation of a WPT-enabled receiving device according to an exemplary embodiment of the disclosure.

FIG. 4B illustrates a second coupler and tuning module implementation of a WPT-enabled receiving device according to an exemplary embodiment of the disclosure. Tuning system 450 operates in a similar manner as tuning system 400. Therefore, only differences between the tuning system 400 and the tuning system 450 will be described.

As shown in FIG. 4B, tuning module 455 includes switches 460 and 462, capacitor 452, and inductor 456. Switches 460 and 462 couple capacitor 452 and inductor 456, respectively, to a common ground point. It should be noted that although both capacitor 452 and inductor 456 are shown in FIG. 4B, that tuning module 455 is not limited to this embodiment. Rather, the tuning module can be configured to implement the capacitor 452, the inductor 456, or both.

By switching the capacitor 452 and/or the inductor 456 to ground at periodic intervals, the frequency response of the tuning system 450 can be adjusted. In addition to adjustment of the frequency response, the configuration shown in FIG. 4B also provides an additional path to ground for the coupled power signal. Therefore, the implementation shown in FIG. 4B allows tuning module 430 to couple additional current and/or voltage coupled through the coupling element 402 to ground to prevent excessive current and/or voltage levels from being transferred to the interface module 435.

An Exemplary Coupler and Tuning Module in a WPT-Enabled Transmitting Device

Figure 7:
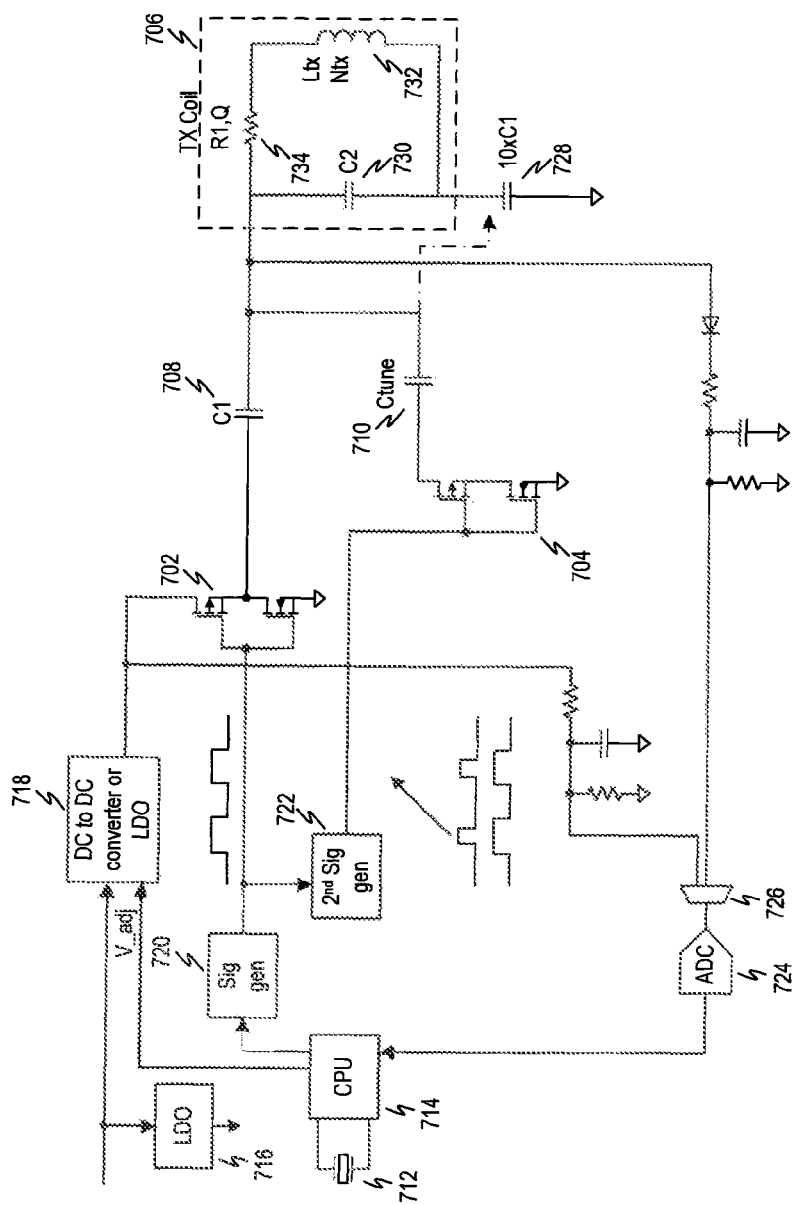
FIG. 7 illustrates a coupler and tuning module implementation of a WPT-enabled transmitting device according to an exemplary embodiment of the disclosure.

FIG. 7 illustrates a coupler and tuning module implementation of a WPT-enabled transmitter device according to an exemplary embodiment of the disclosure. Tuning system 700 includes a low dropout regulator (LDO) 716, a central processing unit (CPU) 714, a crystal 712, a DC-to-DC converter 718, signal generators 720 and 722, an analog-to-digital converter (ADC) 724, a multiplexer 726, switching modules 702 and 704, capacitors 708, 710, and 728, and coupler module 706.

The coupler module 706 can represent an exemplary embodiment of the coupler module 212. The crystal 712 can represent an exemplary embodiment of the oscillator module 208. The LDO 716, the DC-to-DC converter 718, the CPU 714, signal generators 720 and 722, ADC 724, and multiplexer 726 can all be an exemplary embodiment of the controller module 202. Switching module 702 can represent an exemplary embodiment of the driver module 204. Switching module 704 and capacitors 708, 710, can represent an exemplary embodiment of the tuning module 210.

The CPU 714 can communicate with and control the frequency and duty cycle of signals generated by the signal generators 720 and 722. Although FIG. 7 illustrates signal generator 720 coupled to signal generator 722, the CPU 714 can also control the signal generator 722 separately from the signal generator 720.

The signal generator 720 provides an AC voltage to a control electrode of the switching module 702 to modulate the DC signal provided at the switching module 702. By controlling the switching states of the switching module 702, switching module 702 modulates the DC voltage provided by DC-to-DC converter 718 in accordance with a specific predetermined WPT protocol carrier frequency. The switching module 702 provides this modulated data as the power signal to capacitor 708, which in turn couples the power signal to the tuning module 706.

The signal generator 720 and/or the CPU 714 controls the frequency and duty cycle of the signal generator 722 to periodically couple capacitor 710 to ground in phase with the signal generated by the signal generator 720. By changing the frequency and duty cycle of the signal generated by the signal generator 722, the capacitance of capacitor 710 can be switched in and out of the tuning system 700 by the switching module 704 in phase with the WPT protocol carrier frequency. Similar to the tuning module 220 provided as part of the WPT-enabled receiving device 260, coupling the capacitor 710 to ground periodically adjusts the overall frequency response of the tuning system 700. Therefore, by adjusting the frequency and duty cycle of the signal generated by the signal generator 722, the overall frequency response of the tuning system 700 can be adjusted.

Coupling module 706 includes resistive element 734, capacitor 730 and coupling element 732. The resistive element 734 provides current limiting and impedance matching between the coupling element 732 and the capacitor 730. The coupling module 706 transforms the power signal coupled to the coupling module 706 via the capacitor 708 to a wireless power signal, which is transmitted to a WPT-enabled receiving device, such as WPT-enabled receiving device 260.

The CPU 714 can sample both the power signal coupled to the coupling module 706 and the DC signal provided to the switching module 702 via the ADC 724 and the multiplexer 726. Using this information, the CPU 714 can adjust the output of DC-to-DC converter 718 such that excessive voltages are not coupled to the coupling module 706 as the frequency response of the tuning system 700 is adjusted.

To provide a lower voltage across switching module 704, the capacitor 710 can be coupled to capacitor 728 instead of capacitor 708, as indicated in FIG. 7 by the dashed line. Capacitor 728 can be selected having an appropriate capacitive value large enough so as not to influence the capacitance of capacitors 708 and 730, while also providing a lower voltage across switching module 704 when switched to ground than the voltage that would otherwise be coupled from the power signal provided at capacitor 708.

It should also be noted that although tuning system 700 indicates capacitor 710 is switched to ground to adjust the frequency response of tuning system 700, that the disclosure should not be interpreted as so limiting. Those skilled in the art will appreciate that many other switched reactive element configurations may be used, such as those used in the WPT-enabled receiving device 206, for example, without departing from the spirit and scope of the disclosure. To provide an example, the coupling element 732 could have a portion shorted via a switching module, as shown in FIG. 4B, by signal generator 722 and/or the CPU 714, to adjust the frequency response of the tuning system 700.

An Exemplary WPT Session with Multiple WPT-Enabled Receivers

Figure 5:
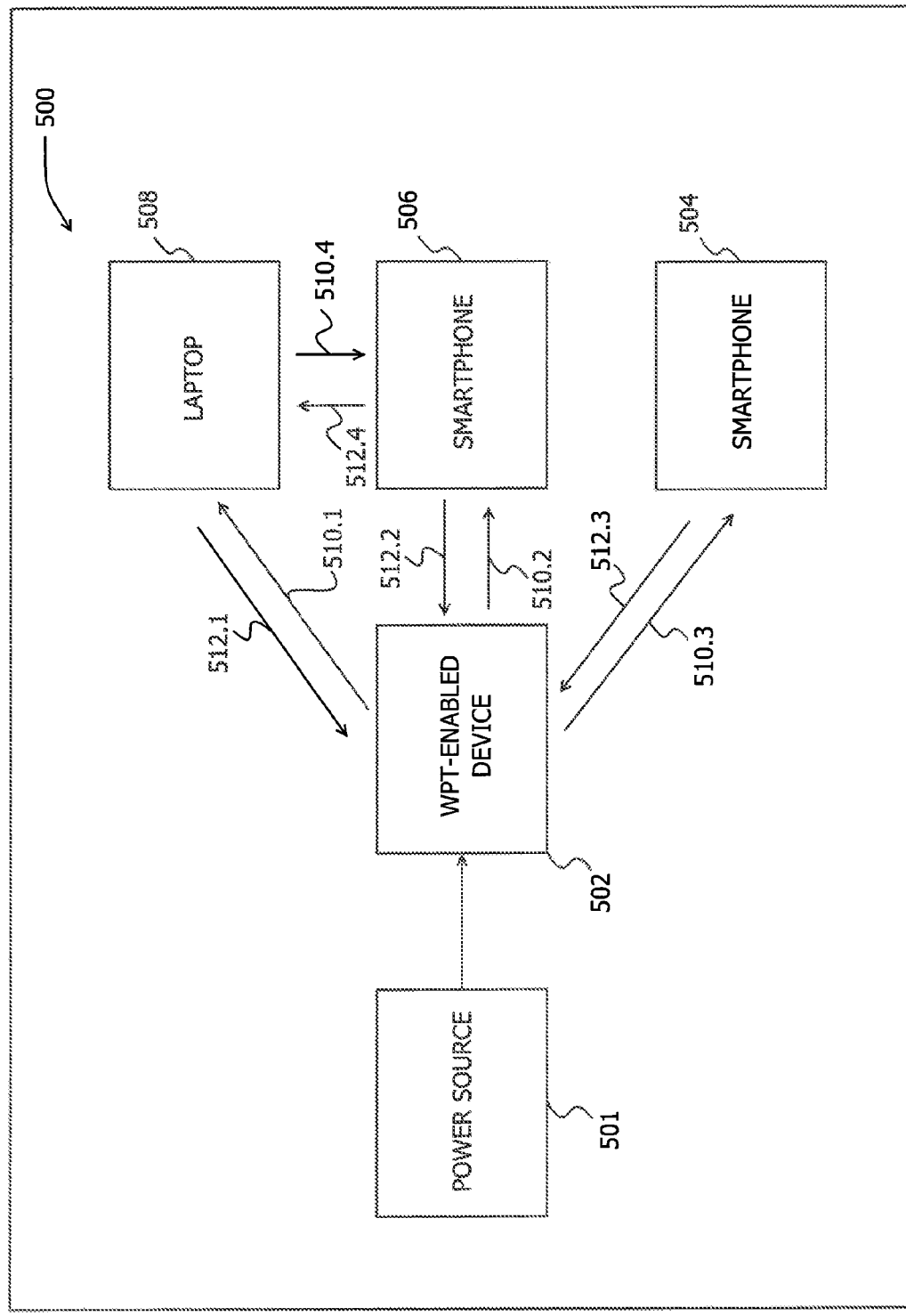
FIG. 5 illustrates multiple WPT-enabled receiving devices coupled to a single WPT-enabled transmitter device according to an exemplary embodiment of the disclosure.

FIG. 5 illustrates multiple WPT-enabled receiving devices coupled to a single WPT-enabled transmitter device according to an exemplary embodiment of the disclosure. A multiple WPT-enabled device power transfer session 500 includes a power source 501, a WPT-enabled transmitting device 502, and multiple WPT-enabled devices including smartphones 504 and 506 and laptop 508. The WPT-enabled transmitting device 502 can represent an exemplary embodiment of the first WPT-enabled device 102. Each of the smartphones 504 and 506, and the laptop 508 can represent an exemplary embodiment of any combination of one or more of the WPT-enabled device 104 and/or the WPT-enabled device 102. The power source 501 can include an AC or DC power source, such as wall or a car outlet, for example. The power source 501 can provide power for all related components of the WPT-enabled transmitting device 502.

The WPT-enabled transmitting device 502 can charge the smartphones 504 and 506, and the laptop 508, simultaneously or in a time-division multiplexed manner via WPT signals 510.1 through 510.3. The operating parameters P1 and/or P2 needed to charge smartphones 504 and 506, and laptop 508 can differ between one another. For example, the laptop 508 can require 10 W of power to charge its battery, while smartphones 504 and 506 can require 2 W. To provide another example, smartphones 504 and 506 can charge more efficiently at a resonant frequency that differs from a resonant frequency of the laptop 508.

The WPT-enabled transmitting device 502 can adjust its operating parameter P1, such as resonant frequency, tuning characteristics, and/or frequency response, to adjust a WPT efficiency between the WPT-enabled transmitting device 502 and the smartphones 504 and 506, and the laptop 508. The WPT-enabled transmitting device 502 can communicate with the smartphones 504 and 506, and the laptop 508 and receive data over communication links 512.1 through 512.3. For example, the WPT-enabled transmitting device 502 can charge each smartphone 504 and 506, and laptop 508 in a time-division multiplexed manner, and monitor the WPT efficiency. Based on the WPT efficiency, the WPT-enabled transmitting device 502 can adjust a frequency response and/or a resonant frequency until the WPT efficiency between the smartphones 504 and 506, and the laptop 508 is improved. By controlling only the frequency response and/or the resonant frequency at the WPT-enabled transmitting device 502, each of the smartphones 504 and 506 and the laptop 508 will match the resonant frequency and/or frequency response of the WPT-enabled transmitting device 502, thereby improving WPT efficiency. In this way, WPT efficiency can be improved without adjusting the operating parameter P2 at the smartphones 504 and 506 and laptop 508.

The smartphones 504 and 506 and the laptop 508 can likewise adjust their respective operating parameter P2, separately, or in combination with, the WPT-enabled transmitting device 502. By both the WPT-enabled transmitting device 502 and the smartphones 504 and 506 and the laptop 508 making such adjustments, an improved WPT efficiency between each device can be quickly obtained.

Although the WPT-enabled transmitting device 502, the smartphones 504 and 506, and the laptop 508 can make adjustments to their respective operating parameter P2 to improve WPT efficiency, such adjustments can be made to intentionally decrease WPT efficiency. For example, the WPT-enabled transmitting device 502 can maintain a constant power output despite the smartphones 504 and 506 and the laptop 508 having separate power requirements. In other words, the smartphones 504 and 506 can adjust their frequency responses to detune, or decrease their respective WPT efficiencies and safely charge in the presence of a higher power signal generated by the WPT-enabled transmitting device 502.

Any of the smartphones 504 and 506, and/or the laptop 508 can also detune their respective frequency responses to a point in which that particular device is no longer receiving WPT from the WPT-enabled device 502. For example, smartphone 506 can detune its frequency response to such a degree that smartphone 506 is no longer receiving any portion, or only a small portion of the WPT signal 510.2. Because the WPT-enabled device 502 can receive operating parameters P2 from the smartphones 504 and 506, and laptop 508, the WPT-enabled device can determine the total power delivered to the laptop 508 and the smartphone 504. Using this information, the WPT-enabled device 502 can also determine how much of the WPT signal 510.2 is coupled to the smartphone 506 which is substantially a result of only the metal content of the smartphone 506.

The information regarding coupling of the WPT signal based on the metal content of the smartphone 506 can be used by the WPT-enabled device 502 to assist the WPT-enabled device 502 in detecting foreign objects as opposed to valid WPT recipients. For example, using this information, the WPT-enabled device 502 can accurately determine the total amount of power that should delivered to the smartphones 504 and 506, and laptop 508 based on the operating parameters received from each of them. If the total power delivery exceeds this expectation, then WPT-enabled device 502 can shutdown, as this excessive power delivery would be due to a foreign object in the proximity of the WPT-enabled device 502, which is undesired due to safety concerns. As a result, de-tuning at the receiver can be used to enable foreign object detection.

After the smartphones 504 and 506 and the laptop 508 are charged from receiving a WPT from the WPT-enabled transmitting device 502, the smartphone 506 and the laptop 508 can then be removed, and during subsequent use, their respective batteries can discharge. If the smartphone 506 requires a battery charge and the laptop 508 has a sufficiently charged battery, the laptop 508 can initiate a WPT with the smartphone 506 using a WPT signal 510.4, and receive data over a communication link 512.4. The laptop 508 can adjust an operating parameter P2 according to a charge received from the WPT-enabled transmitting device 502. The laptop 508 can charge another device such as the smartphone 506, for example, by adjusting an operating parameter P1 according to a separate frequency response and/or a resonant frequency, for example.

The WPT-enabled transmitting device 502 can adjust various operating parameters using information stored in memory from previous WPT interactions with the smartphones 504 and 506, and the laptop 508. The WPT-enabled transmitting device 502 can identify smartphones 504 and 506, and laptop 508 and their associated charging configurations, which can also include a proportion of the WPT signal which is lost based on a previously determined metal content. Based on the information stored in the memory of the WPT-enabled transmitting device 502, the proper power levels, protocols, and preferable resonant frequencies and/or frequency responses can be applied to charge smartphones 504 and 506, and laptop 508, without going back through the initial adjustment procedure for each device.

The WPT-enabled transmitting device 502, the smartphones 504 and 506, and the laptop 508 can interact over multiple WPT sessions. During an initial session, for example, the WPT-enabled transmitting device 502 can store the operating parameters P1 and/or P2 and settings for the initial WPT interaction session. If the WPT-enabled transmitting device 502 is subsequently paired with the smartphones 504 and 506, and the laptop 508, the WPT-enabled transmitting device 502 can use the stored information to identify smartphones 504 and 506, and the laptop 508. Based on the stored information and the identification, the WPT-enabled transmitting device 502 can adjust the operating parameters P1 and/or P2 and settings to match the previously stored operating parameters P1 and/or P2 and settings.

CONCLUSION

It is to be appreciated that the Detailed Description section, and not the Abstract section, is intended to be used to interpret the claims. The Abstract section can set forth one or more, but not all exemplary embodiments, of the disclosure, and thus, are not intended to limit the disclosure and the appended claims in any way.

The disclosure has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

It should be noted that the buses shown throughout the illustrations should not be interpreted strictly as single wired or wireless connections. Any, some, or all of the buses indicated throughout can be a grouping of multiple connections, a grouping of wireless links, or a combination of wired and wireless links. Furthermore, the various buses should not be interpreted as limited to carrying only one type of signal or limited to a single type of wiring. For example, coupler buses can be implemented as coaxial cables, while other buses can be implemented as part of a printed circuit board wiring. Finally, the buses can carry a variety of signals such as analog, digital, or mixed signals in accordance with the spirit and scope of the disclosure.

It will be apparent to those skilled in the relevant art(s) that various changes in form and detail can be made therein without departing from the spirit and scope of the disclosure. Thus the disclosure should not be limited by any of the above-described exemplary embodiments, but should be defined only in accordance with the following claims and their equivalents.

What is claimed is:

1. A wireless power transfer (WPT)-enabled device, comprising:
   a communications module configured to communicate with a second WPT-enabled device and to determine a WPT operating parameter associated with WPT between the WPT-enabled device to the second WPT-enabled device;
   a driver module configured to generate a power signal for charging the second WPT-enabled device according to the WPT operating parameter, the power signal having a first resonant frequency;
   a tuning module having a first frequency response, the tuning module including a capacitor and a first switch configured to vary the first frequency response by selectively grounding the capacitor;
   a coupler module having a second frequency response, the coupler module including a coupling element and a second switch configured to vary the second frequency response by shorting a portion of the coupling element; and
   a controller module configured to adjust the first resonant frequency until the first resonant frequency is substantially similar to a second resonant frequency of the second WPT-enabled device and to control the WPT operating parameter by controlling the first switch or the second switch.

2. The WPT-enabled device of claim 1, wherein the first resonant frequency is based on an oscillator frequency, and wherein the controller module is further configured to adjust the first resonant frequency by adjusting the oscillator frequency.

3. The WPT-enabled device of claim 1, wherein the WPT operating parameter is indicative of a WPT efficiency.

4. The WPT-enabled device of claim 1, wherein:
   the tuning module is configured to transfer the power signal to the second WPT-enabled device according to the first frequency response, and to receive a charging signal from a third WPT-enabled device according to a third frequency response,
   wherein the controller module is further configured to control the WPT operating parameter by adjusting the first frequency response, the second frequency response, or the third frequency response.

5. The WPT-enabled device of claim 1, wherein the controller module is further configured to store settings associated with the first frequency response or the second frequency response, and to apply the settings to charge a third WPT-enabled device.

6. A wireless power transfer (WPT)-enabled device having a first resonant frequency, comprising:
   a tuning module configured to receive a power signal from a second WPT-enabled device having a second resonant frequency, and to provide a charge signal to a load according to a first frequency response, the tuning module having first and second capacitors and a first switch;
   a coupler module having a second frequency response, the coupler module including a coupling element and a second switch configured to vary the second frequency response by shorting a portion of the coupling element; and
   a controller module configured to adjust the first frequency response by controlling the first switch to selectively couple the second capacitor in parallel with the first capacitor to regulate the charge signal and to adjust the first resonant frequency to be substantially similar to the second resonant frequency by controlling the first switch or the second switch.

7. The WPT-enabled device of claim 6, wherein the controller module is further configured to control a WPT operating parameter by adjusting the first frequency response or the second frequency response.

8. The WPT-enabled device of claim 7, wherein the WPT operating parameter is indicative of a WPT efficiency.

9. The WPT-enabled device of claim 7, wherein the WPT operating parameter comprises:
   a power level of the charge signal.

10. The WPT-enabled device of claim 7, wherein the coupler module further comprises:
a variable reactance element, and wherein the controller module is further configured to adjust a reactance of the variable reactance element.

11. A wireless power transfer (WPT)-enabled device, comprising:
a driver module configured to a generate power signal having a first resonant frequency;
a tuning module having a first frequency response, the tuning module including a capacitor and a first switch configured to vary the first frequency response by selectively grounding the capacitor, and wherein the tuning module is configured to receive the power signal and to provide a charging signal for charging a second WPT-enabled device;
a coupler module having a second frequency response, the coupler module including a coupling element and a second switch configured to vary the second frequency response by shorting a portion of the coupling element; and
a controller module configured to adjust the first frequency response by controlling the first switch or the second switch until the first resonant frequency is substantially similar to a second resonant frequency of the second WPT-enabled device.

12. The WPT-enabled device of claim 11, wherein the controller module is further configured to control a WPT operating parameter by adjusting the first frequency response or the second frequency response.

13. The WPT-enabled device of claim 12, wherein the WPT operating parameter is indicative of a WPT efficiency.

14. The WPT-enabled device of claim 1, wherein the controller module is further configured to store settings associated with the WPT operating parameter associated with WPT between the WPT-enabled device to the second WPT-enabled device and applies the stored settings when the second WPT-enabled device is charged by the WPT-enabled device at a subsequent time.

15. The WPT-enabled device of claim 1, wherein the controller module is further configured to open and close the first switch or the second switch at a rate that is based on a frequency of the power signal.

16. The WPT-enabled device of claim 15, wherein the rate is twice the frequency of the power signal.

17. The WPT-enabled device of claim 6, wherein the controller module is further configured to open and close the first switch or the second switch at a rate that is based on a frequency of the power signal.

18. The WPT-enabled device of claim 17, wherein the rate is twice the frequency of the power signal.

19. The WPT-enabled device of claim 11, wherein the controller module is further configured to open and close the first switch or the second switch at a rate that is based on a frequency of the power signal.

20. The WPT-enabled device of claim 19, wherein the rate is twice the frequency of the power signal.

* * * * *

UNITED STATES PATENT AND TRADEMARK OFFICE
CERTIFICATE OF CORRECTION

PATENT NO. : 9,680,326 B2  
APPLICATION NO. : 13/841826  
DATED : June 13, 2017  
INVENTOR(S) : Van Der Lee et al.

Page 1 of 1

It is certified that error appears in the above-identified patent and that said Letters Patent is hereby corrected as shown below:

In the Claims

In Column 19, Line 8, replace "a generate power signal" with --generate a power signal--.

Signed and Sealed this  
Fourth Day of June, 2019

Andrei Iancu  
*Director of the United States Patent and Trademark Office*